United States Patent [19]
Brewer et al.

[11] Patent Number: 5,825,503
[45] Date of Patent: Oct. 20, 1998

[54] ENGRAVING APPARATUS AND METHOD FOR ADJUSTING A WORN STYLUS USING A MIDTONE CORRECTION

[75] Inventors: Matthew C. Brewer; David M. Reese, both of Dayton; Curtis Woods, Centerville, all of Ohio

[73] Assignee: Ohio Electronic Engravers, Inc., Dayton, Ohio

[21] Appl. No.: 394,717

[22] Filed: Feb. 27, 1995

Related U.S. Application Data

[63] Continuation-in-part of Ser. No. 125,938, Sep. 23, 1993, Pat. No. 5,440,398, which is a continuation-in-part of Ser. No. 38,679, Mar. 26, 1993, Pat. No. 5,438,422, which is a continuation-in-part of Ser. No. 22,127, Feb. 25, 1993, Pat. No. 5,424,845.

[51] Int. Cl.$^6$ ...................................................... B41C 1/04
[52] U.S. Cl. ............................................................ 358/299
[58] Field of Search ............................................ 358/299

[56] References Cited

U.S. PATENT DOCUMENTS

| | | | |
|---|---|---|---|
| 2,493,628 | 1/1950 | Harley | 88/14 |
| 2,777,058 | 1/1957 | Bouajean | 250/27 |
| 2,874,479 | 2/1959 | Farber | 33/185 |

(List continued on next page.)

FOREIGN PATENT DOCUMENTS 0595324  5/1994  European Pat. Off. .

OTHER PUBLICATIONS

"Numerical analysis: A Practical Approach", Melvin J. Mason, p. 188 (No Date).
"Image Processing Handbook", John C. Russ, pp. 105–113, (1992).
"Numerical Recipes in C The Art of Scientific Computing", William H. Press, Brian P. Flannery, Saul A. Teukolsky, and William T. Vetterling, pp. 452–460, (1988).
"Datwyler", Max Daetwyler Corporation, 13420 West Reese Blvd, Huntersville, N.C. 28078 (Undated brochure).
"Twin–Pilot", Maschinenfabrik Kaspar Walter GmbH & Co. KG, Plnganserstrasse 22, 8000 Munchen 70, Germany, (Undated Brochure).
Germany, (Undated Brochure).
Brochure Entitled, "Midtone Stylus correction—Maximizing the Results," 3 pgs., Undated.
Brochure Entitled, "An American Digital Electronic Engraver," *Gravure Research Institute,* Ohio Electronic Engravers, Inc., Rpt#M–106, 12 pgs. Nov. '78.
Brochure Entitled, "The Ohio Electronic Engraving System," *Gravure Research Institute,* Ohio Electronic, Inc., Rpt #M–356, 19 pgs, Nov. '86.
Brochure Entitled, "Interactive Gamma Editor," by Ohio Electronic Engravers, Inc., 2 pgs., Sep. 1992.
Brochure Entitled, "Selective Area Gamma," by Ohio Electronic Engravers, Inc., 2 pgs., Sep. 1992.
Brochure Entitled, "Simultaneous Engraving From Halftone & Line Copy," by Ohio Electronic Engravers, Inc., 8 pgs., Apr. '86.
Brochure Entitled, "Ohio Prepress System Update," by Ohio Electronic Engravers, Inc., 13 pgs. Undated.

*Primary Examiner*—Eric Frahm
*Attorney, Agent, or Firm*—Jacox. Meckstroth & Jenkins

[57] ABSTRACT

A method of engraving which accommodates changes in copper hardness, variations in head linearities, worn stylus, and the like. The method involves the cutting of midtone test cells, as well as highlight and full width test cells. The widths of the test cells are measured and used to establish slopes and offsets for adjustment lines, which in turn are applied inversely to transform a desired cell width into an engraving drive signal. The technique assures that the computed engraving drive signal will produce the desired cell width.

11 Claims, 3 Drawing Sheets

U.S. PATENT DOCUMENTS

| | | | |
|---|---|---|---|
| 2,943,564 | 7/1960 | Demer | 101/93 |
| 3,612,753 | 10/1971 | Korman | 178/5.2 A |
| 3,652,992 | 3/1972 | Koll | 340/146.3 B |
| 3,876,829 | 4/1975 | Schreiber | 178/7.3 D |
| 3,904,816 | 9/1975 | Taudt | 178358/6 |
| 3,918,348 | 11/1975 | Runft | 90/11 R |
| 3,931,570 | 1/1976 | George et al. | 324/34 R |
| 3,956,583 | 5/1976 | Pugsley | 178/6.6 R |
| 4,001,495 | 1/1977 | Tauzig | 358/294 |
| 4,012,584 | 3/1977 | Gasscoigne | 358/302 |
| 4,052,739 | 10/1977 | Wada et al. | 358/299 |
| 4,072,928 | 2/1978 | Wilder | 340/146.3 H |
| 4,075,662 | 2/1978 | Gall | 358/280 |
| 4,240,118 | 12/1980 | Wellendorf et al. | 358/296 |
| 4,315,285 | 2/1982 | Sommer et al. | 358/280 |
| 4,342,050 | 7/1982 | Traino | 358/256 |
| 4,394,693 | 7/1983 | Shirley | 358/298 |
| 4,437,122 | 3/1984 | Walsh et al. | 358/166 |
| 4,451,856 | 5/1984 | Buechler | 358/299 |
| 4,503,468 | 3/1985 | Serinken et al. | 358/256 |
| 4,612,584 | 9/1986 | George et al. | 358/299 |
| 4,683,499 | 7/1987 | Kuwabara | 358/264 |
| 4,683,500 | 7/1987 | Kitamura et al. | 358/280 |
| 4,691,229 | 9/1987 | Colditz et al. | 358/76 |
| 4,691,238 | 9/1987 | Yamada | 358/280 |
| 4,700,235 | 10/1987 | Gall | 358/283 |
| 4,944,593 | 7/1990 | Kalstroem et al. | 356/379 |
| 4,972,323 | 11/1990 | Cauwet | 364/474.29 |
| 5,029,011 | 7/1991 | Fraser | 358/299 |
| 5,229,861 | 7/1993 | Nozaka et al. | 358/299 |
| 5,293,426 | 3/1994 | Wouch et al. | 382/1 |
| 5,389,955 | 2/1995 | Suzuki | 347/112 |
| 5,528,515 | 6/1996 | Hayashi | 364/525 |
| 5,621,533 | 4/1997 | Holowko et al. | 358/299 |

FIG-3
FIG-4
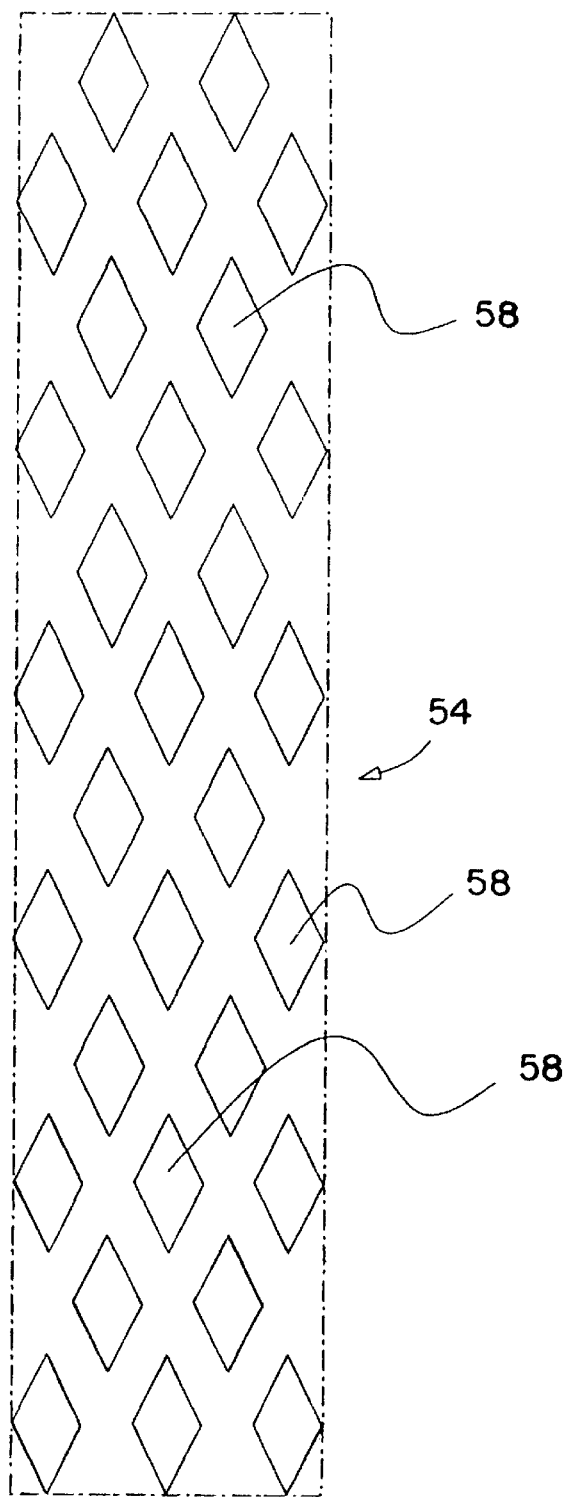
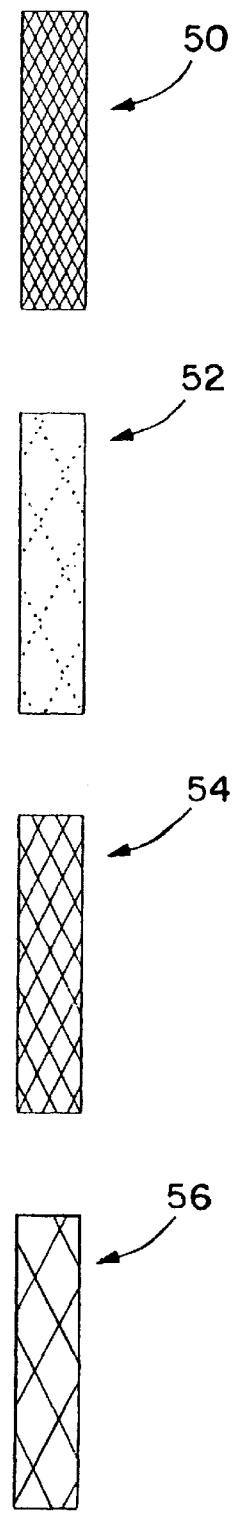

ENGRAVING APPARATUS AND METHOD FOR ADJUSTING A WORN STYLUS USING A MIDTONE CORRECTION

CROSS-REFERENCE TO RELATED APPLICATIONS

This application is a continuation-in-part of application Ser. No. 08/125,938, filed Sep. 23, 1993, now U.S. Pat. No. 5,440,398, which is a continuation-in-part of U.S. application Ser. No. 08/038,679, filed Mar. 26, 1993, now U.S. Pat. No. 5,438,422, which is a continuation-in-part of U.S. application Ser. No. 08/022,127, filed Feb. 25, 1993, now U.S. Pat. No. 5,424,845, all of which are owned by the same assignee of this invention and all of which are incorporated herein by reference.

BACKGROUND OF THE INVENTION

This invention relates to the field of engraving and more particularly to engraving of accurately sized ink-receiving cells on the surface of a gravure printing cylinder. Even more particularly it relates to correction of an engraving control signal to compensate for tip wear on an engraving stylus.

Engraving styli are typically constructed from long-wearing industrial diamonds. Such styli have an angled engraving tip, typically configured with two cutting edges angled upwardly from a centrally positioned point. Typically the two cutting edges meet at an angle of about 120 degrees.

Prior art engraving systems have generally operated on the assumption that the cutting edges of the stylus remain linear, despite wearing of the engraving tip. The engravers are calibrated by positioning the engraving tip at a rest position spaced from the engraving cylinder to provide a white offset. Then the engraving stylus is oscillated into engraving contact with the surface of the printing cylinder to print a pattern of test cells. Customarily two patterns of cells are engraved, a first pattern being engraved by oscillating the stylus with a black level driving signal, and a second pattern being engraved by oscillating the stylus with a highlight driving signal. The black level driving signal has an amplitude which drives the stylus to a depth which produces substantially full width cells for a linear tip having the prescribed tip angle. The highlight signal typically has a level which is 20 to 30 percent of a black level signal and produces relatively small printing cells.

The prior art practice has involved measuring the widths of the black cells and the highlight cells, calculating the width difference and dividing that difference by the test signal difference to establish a gain factor. This gain factor then has been used as a multiplier for digitized grey level image commands received from a film scanner, computer imaging system or other input device. The use of such a gain factor is based upon the assumption that cell width will vary linearly with changes in the grey level command. However, diamond tips tend to wear non-linearly. The tips develop a slight curvature which causes a non-linear engraving action. The test cells ordinarily are cut near the end of the printing cylinder prior to production engraving.

The prior art calibration technique produces fairly acceptable results for a new stylus. For an old stylus the results are less acceptable, and deteriorate as the engraving progresses and the tip wear continues. It is an object of this invention to solve that problem.

SUMMARY OF THE INVENTION

This invention overcomes engraving tip linearity problems by supplementing prior art engraving test patterns with midtone test cells of one or more sizes. The midtone cells have a width intermediate the width of a highlight cell and a black cell. This enables calculation of an engraving drive signal which will produce a desired cell width, preferably using linear techniques. The method involves a forward transformation wherein an engraving command signal is used to calculate the cell width which would be engraved by an engraving stylus having linear cutting edges. The forward transformation is followed by a reverse transformation wherein the calculated (desired) cell width is used to calculate the correct driving signal for the worn engraving stylus.

In the preferred embodiment the measured widths of the engraved test cells are used for establishment of width ranges or bands. A linear inverse transformation function is established within each width range. These transformation functions may be in the form of straight line equations having slopes and intercepts for adjusting the magnitude of an engraving drive signal.

Also, in the preferred embodiment two midtone test patterns of different optical density are engraved in addition to the usual highlight and full width cell patterns. The widths of four cells are measured, one cell from each pattern, and these widths are used to establish four boundaries for four width ranges. The white offset provides a fifth boundary.

A gain term in the form of a line slope is established within each width range. Line offsets, or intercepts, are also established within each range. During engraving a series of engraving commands are converted into desired width commands by a forward transformation of the form:

width(desired)=gain(new)*command+white offset.

These desired widths are transformed inversely into drive signals by an equation of the form:

drive signal=(width(desired)−offset(worn))/gain(worn).

In a particularly preferred embodiment a range of drive signals are pre-computed during setup, tabulated and stored. The tabulated values are read out and used for stylus control during production engraving It is therefore an object of this invention to improve the accuracy of a gravure engraver.

Other objects and advantages of the invention will be apparent from the following description, the accompanying drawings and the appended claims.

BRIEF DESCRIPTION OF THE DRAWING

FIG. 3 is an enlarged illustration of a pattern of midtone test cells;

FIG. 4 is a schematic illustration of four test cell patterns of different optical density.

DESCRIPTION OF THE PREFERRED EMBODIMENT

Figure 1:
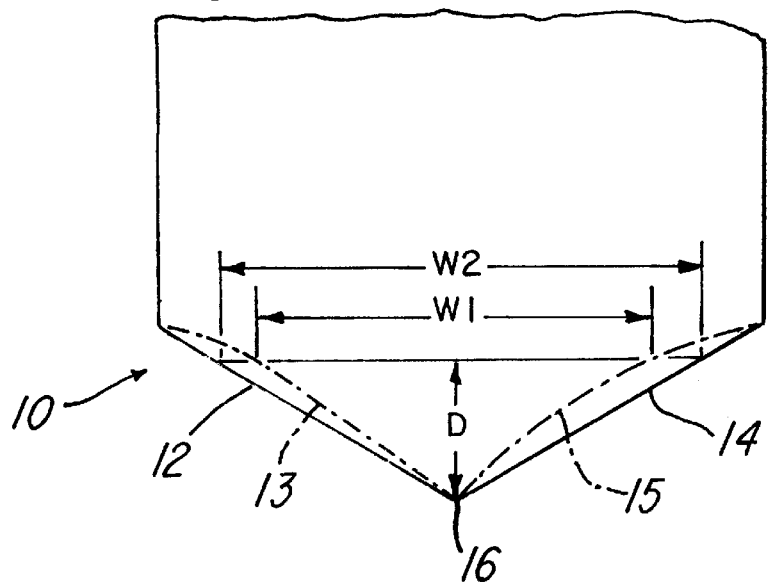
FIG. 1 is an enlarged schematic illustration of a stylus tip.

A detailed understanding of the problem solved by the present invention may be gained by referring to FIG. 1 which illustrates a greatly enlarged stylus tip 10. Stylus tip 10 has a pair of linear cutting edges 12, 14 which meet at a point 16. Lines 12, 14 may intersect at an angle of about 120 degrees, so that when tip 10 is driven into an engraving cylinder to a depth D, a cell of width W2 is engraved. However, during the course of use cutting edges 12, 14 become worn and curved as illustrated by phantom lines 13, 14. In this condition a penetration of tip 10 to a depth D produces a reduced size cell having a width W1. This means that the engraving signal must be increased in a non-linear manner to drive the stylus 10 to a greater depth in order to achieve the same cell width.

This invention detects engraving tip wear by engraving a series of test cells having at least three different widths. Preferably four patterns of test cells 50, 52, 54, 56 are engraved in the direction of rotation of the engraving cylinder, as illustrated in FIG. 4. Each pattern consists of 12 identically sized cells engraved in each of five consecutive cylinder rotations, as illustrated by midtone cells 58 shown in enlarged form in FIG. 3. Test pattern 50 therefore consists of 12 full width test cells arranged in a pattern similar to that illustrated in FIG. 3. Pattern 52 comprises 12 highlight cells. Patterns 54 and 56 comprise dark and light midtone cells respectively. The cell patterns are separated by a distance of approximately four cell widths.

After the test cell patterns have been engraved the printing cylinder may be stopped for examination of the cell widths by a conventional microscope. Alternatively, the test cells may be examined during continuing rotation of the printing cylinder through use of a video scanner and a strobe. In either event a single cell is selected from each pattern, and the selected cells are measured to obtain four cell widths corresponding to four engraving drive signal levels. In yet another alternative, cell widths for three or four or more reference level driving signals may be obtained by video scanning during closed loop engraving, as described in co-pending application Ser. No. 08/038,679 which is assigned to the Assignee hereof and which is incorporated herein by reference.

Figure 2:
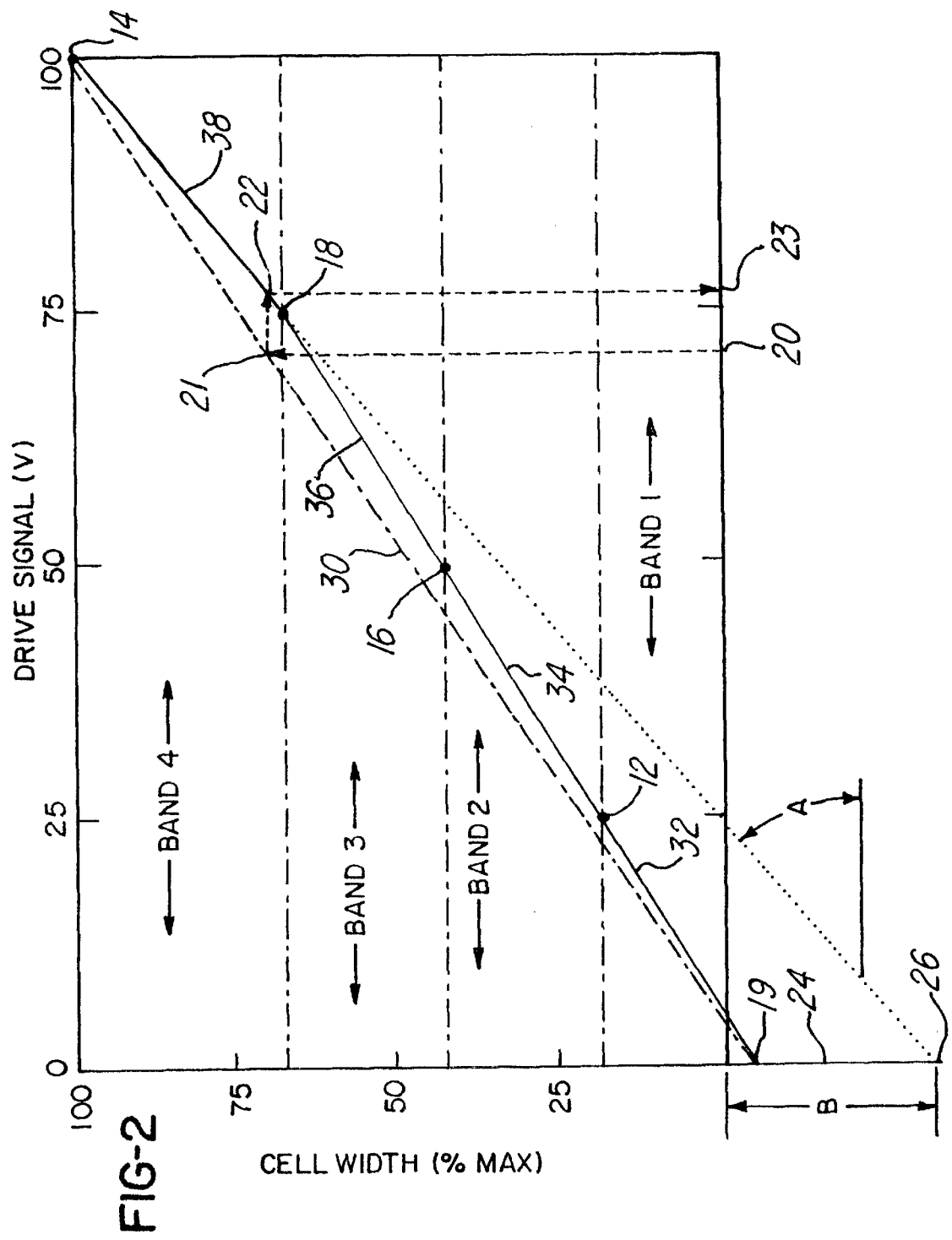
FIG. 2 is a graphic illustration of engraving drive signal adjustment in accordance with the method of this invention.

FIG. 2 illustrates a technique for using four cell widths to generate corrected engraving drive signals. The four cell widths are normalized to a percentage of maximum cell width and plotted on FIG. 2 at points 12, 14, 16, 18. The plots illustrate the drive signal corresponding to each normalized cell width. Plot points 12, 14 illustrate measured widths for highlight and full width cells respectively. Plot points 16, 18 show cell widths and corresponding drive signals for light midtone and dark midtone cells respectively. The four plot points 12, 14, 16, 18, together with a white offset point 19 define end points for four adjustment lines 32, 34, 36, 38.

Each of the four adjustment lines is used for adjustment within one of four width bands as illustrated in FIG. 2. Each adjustment line has an associated slope and an associated intercept with the Y-axis 24. By way of example, adjustment line 38 has a slope equal to the tangent of an illustrated angle A. It also meets the Y-axis 24 at an offset point 26 having an offset distance B. The line slopes and line intercepts are used in a computer program as set forth in the program listing of Table I. FIG. 2 presents a graphical illustration of the operation of the computer program.

By way of example assume that a video signal generator generates a drive signal of approximately 71 volts as indicated at point 20. This signal is projected upwardly to line 30 which is the nominal gain line for a new stylus. The upward projection from point 20 meets line 30 at point 21, which is in band 4. Band 4 is the width band allocated to adjustment line 38. Therefore a horizontal projection is taken from point 21 to adjustment line 38. It will be seen that an intercept occurs at point 22, which may be projected downwardly to point 23 on the horizontal axis of the chart. Point 23 has a drive signal level of about 77 volts. Therefore the computer program which will be described below responds to a 71 volt engraving command by generating a 77 volt engraving drive signal. A 71 volt drive input represents a desired cell width of 69 percent of max. This is what a new stylus would produce. A worn stylus produces that same cell width when driven by a drive signal of 77 volts.

Table No. I presents a source code program for performing the operations illustrated in FIG. 2. The code is written in C language. For ease of explanation line numbers have been added to the listing. It will be appreciated that line numbers ordinarily do not appear in C language listings.

The program begins at line 3 with a directive defining the term "TRIALS" as a variable having a value of 4. This variable can be set in accordance with the number of types of test patterns to be engraved. In the preferred embodiment the invention uses a highlight pattern, a light midtone pattern, a dark midtone pattern and a full width pattern, so that the variable "TRIALS" requires a value of 4.

Lines 4 and 5 direct the compiler to include two standard library files in the executable file. Line 6 directs the compiler to include a program (not illustrated) which controls the engraver to engrave the required test cuts. Lines 7–9 direct the compiler to include programs (not illustrated) which respectively return the values of the test signals, get engraving commands, and perform production engraving. The main routine begins at line 10.

At lines 11–24 the program declares float variables and integer variables which are used later in the program.

At lines 25–31 the program fills four tables with test cut information. A first table testsig_upper contains the values of test signals used for engraving test points at the tops of the four bands illustrated in FIG. 2. The corresponding test cell widths are stored in the second table, identified as width_upper. Test signal values and cell widths for points at the bottoms of the four bands are stored in tables denoted testsig_lower and width_lower, respectively. It will be appreciated that the variables testsig_lower and width_lower have no corresponding test pattern for i=1. When i=1, testsig_lower=0, and width_lower has a negative value equal to the white offset. Those skilled in the art will understand that the white offset is established as part of a routine setup procedure. The white offset is read by the program test_cut.c.

At line 32 the program calls the routine get_engrave_signal to read an engraving command signal. At lines 33 through 36 the engraving command signal is converted into a desired width. This is a forward transformation which involves calculating new_gain, the gain for a new, unworn, stylus (i.e. the slope of line 30 of FIG. 2). Later, at line 47, the desired width is converted into a drive signal by a transformation which is substantially the inverse of the forward transformation of line 35. However, the inverse transformation requires selection of a gain and an offset. This is analogous to selection of an adjustment line, as discussed above in connection with the description of FIG. 2.

Selection of the appropriate adjustment line commences with an iterative process as set forth at lines 37–40. This produces a width range corresponding to one of the four bands illustrated in FIG. 2. The width range determination is used as an argument for entry into the tables which were declared at lines 14–17 and filled at lines 25–31. The values read from the tables are used at lines 41–45 to calculate a gain value for the worn stylus. Values from those tables are also used at lines 45, 46 to determine the offset for the selected adjustment line. Thereafter the program performs the inverse transformation of line 47, followed by transmission of a drive signal to the engraver at line 48.

It will be appreciated that other techniques could be used for converting the desired width into a drive signal, provided, however, that at least three measured test widths are available to accommodate curvature of the stylus and providing, further, that those three values be used for inversely transforming a desired width into a drive signal which will produce that width.

In another embodiment of the invention the inverse transformation performed at lines 37–47 of Table I may be accomplished by use of an appropriate storage device such as, for instance, a random access memory or an EEPROM. In that particular embodiment the computer calculates the drive signal over the entire range of desired widths. The results are stored in the storage device. Such an arrangement is illustrated in FIG. 5.

Figure 5:
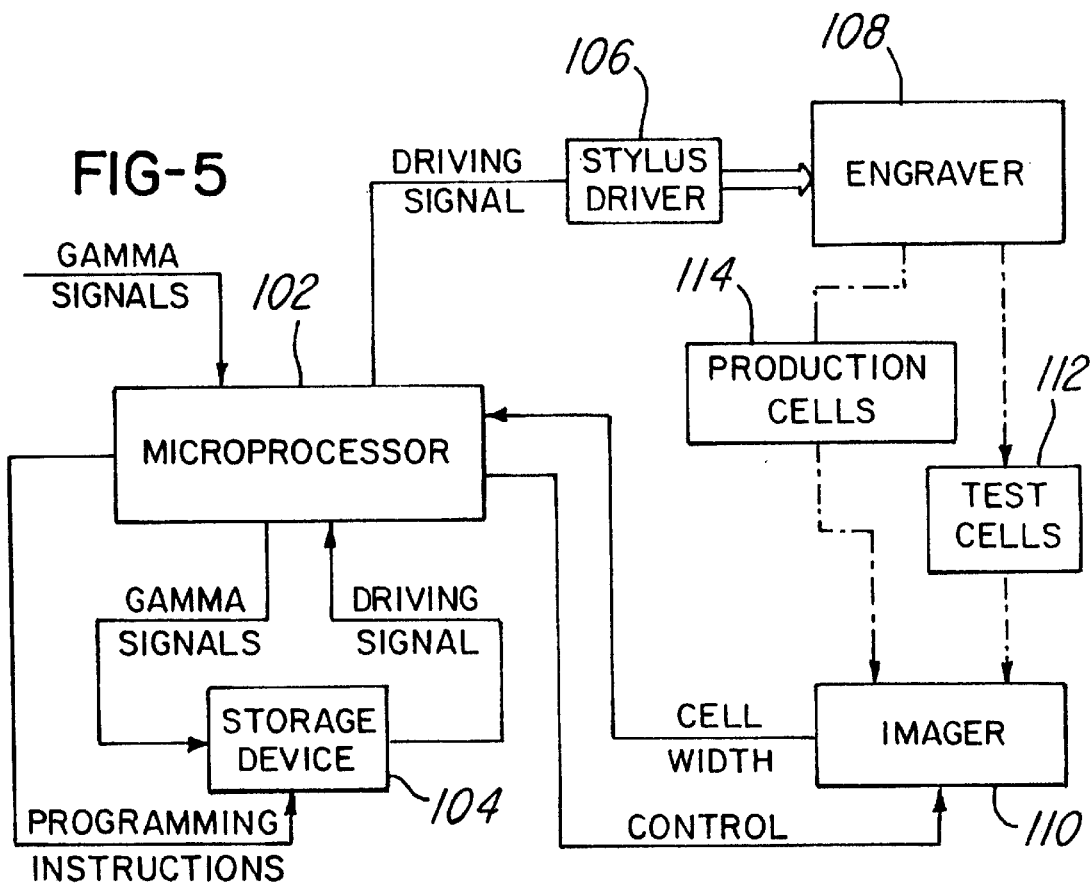
FIG. 5, which is shown on the same sheet as FIG. 1, shows a system in accordance with an embodiment of this invention.

Referring now to FIG. 5, there is illustrated a microprocessor 102 connected to a storage device 104. Engraving commands in the form of gamma signals are supplied to microprocessor 102 for calculation of driving signals for a stylus driver 106. Microprocessor 102 calculates the desired widths for an entire range of gamma signals, typically 256 different values. The desired widths are converted into driving signals, in the manner described above or by other equivalent procedures, and the results are stored in storage device 104 in tabulated form. Once that has been accomplished, production printing may proceed.

During production printing, microprocessor 102 uses the gamma signals as addresses for driving signals stored in storage device 104. This substantially speeds up the process of generating driving signals having substantially correct values for the worn stylus.

The arrangement of FIG. 5 also includes a scanner 170 which operates under control of microprocessor 102 and which scans either test cells 112 or production cells 114 to establish the widths thereof. The measured cell widths are supplied to microprocessor 102 for closed loop control of engraver 108.

Microprocessor 102 uses the cell widths generated by an imager or scanner 110 during setup to establish the driving signal values for storage in storage device 104. During closed loop production printing, microprocessor 102 may compare measured cell widths with driving signals which produced those cell widths and update the tabulated information stored in storage device 104. Alternatively, microprocessor 104 may merely generate a running error term for addition to the values tabulated and stored in storage device 104.

TABLE I

```
/* midtone.c */
#define TRIALS 4
#include <math.h>
#include <stdio.h>
#include "test_cut.c"
#include "get_test_signal.c"
#include "get_engrave_signal.c"
#include "go_cut.c"
void main()
{
float new_gain, worn_gain;
float offset;
float width_upper[TRIALS + 1];
```

TABLE I-continued

```
float width_lower[TRIALS + 1];
float testsig_upper [TRIALS + 1];
float testsig_lower [TRIALS + 1];
float test_command;
float test_width;
float desired_width;
float engrave_command;
float drive_signal;
int i, j;
int width_range;
*for(i = 1; i <= TRIALS; i++)
    {
    testsig_upper[i] = get_test_signal(i);
    width_upper[i] = test_cut(i);
    testsig_lower[i] = get_test_signal(i - 1);
    width_lower[i] = test_cut(i - 1);
    }
engrave_command = get_engrave_signal ();
new_gain = (width_upper[TRIALS] - width_lower[1]) /
                              testsig_upper[TRIALS];
desired_width = engrave_command * new_gain +
                              width_lower[1];
for(i = 1; i <= TRIALS; i++)
    if(desired_width >= width_lower[i] &&
                         desired_width <= width_upper[i])
        width_range = i;
worn_gain = (width_upper[width_range] -
                         width_lower[width_range]) /
                         (testsig_upper[width range] -
                         testsig_lower [width_range]);
offset = width_upper[width_range] - worn_gain *
                         testsig_upper[width_range];
drive_signal = (desired_width - offset) / worn_gain;
go_cut(drive_signal);
}
```

While the methods herein described constitute preferred embodiments of this invention, it is to be understood that this invention is not limited to these precise methods, and that changes may be made therein without departing from the scope of the invention, which is defined in the appended claims.

What is claimed is:

1. A method of using an engraving stylus having a worn cutting edge to engrave printing cells in a gravure printing surface, said method comprising the steps of:

(1) generating at least three test signals, each having different signal levels;

(2) using said test signals to drive said engraving stylus into said gravure printing surface and engrave test cells having at least three different widths;

(3) measuring said test cells to establish measured values for said widths;

(4) using said signal levels and said measured values to establish an inverse relationship correlating said widths with the test signals which caused them;

(5) generating a series of engraving command signals having signal levels indicating desired widths for a series of cells to be engraved into said gravure printing surface;

(6) using said inverse relationship to convert said engraving command signals into drive signals; and (7) using said drive signals to drive said engraving stylus into engraving contact with said gravure printing surface.

2. A method according to claim 1 wherein said inverse relationship comprises a plurality of linear functions, each associated with a unique range of said desired widths.

3. A method of using an engraving stylus having a worn cutting edge to engrave printing cells in a gravure printing surface, said method comprising the steps of:

(1) generating a series of test signals comprising highlight signals, light midtone signals, dark midtone signals and black level signals having progressively larger signal levels;

(2) using said test signals to drive said engraving stylus into said gravure printing surface and engrave test cells having four different widths;

(3) measuring said test cells to establish measured values for said widths;

(4) using said signal levels and said measured values to establish four linear functions correlating said widths with the test signals which caused them, each said linear function being associated with a unique range of cell widths;

(5) generating a series of engraving command signals having signal levels indicating desired widths for a series of cells to be engraved into said gravure printing surface;

(6) selectively using said linear functions to convert said engraving command signals into drive signals; and (7) using said drive signals to drive said engraving stylus into engraving contact with said gravure printing surface.

4. A method of generating an engraving signal, comprising the steps of:

generating a drive signal corresponding to an pattern of cells to be engraved;

determining a variation between said pattern of cells and a second pattern of cells; and electronically adjusting said drive signal using said variation signal to provide an engraving signal;

wherein said determining step comprises the step of:
comparing a shape of at least one edge of a stylus to a desired shape.

5. A method of generating an engraving signal, comprising the steps of:

generating a drive signal corresponding to a pattern of cells to be engraved;

determining a variation between said pattern of cells and a second pattern of cells; and electronically adjusting said drive signal using said variation signal to provide an engraving signal;

wherein said drive signal is a voltage signal, said method further comprising:
boosting said voltage signal to account for wear of a stylus cutting edge.

6. An engraver for engraving a cylinder comprising:

an engraving head having a stylus for engraving said cylinder;

a processor for generating a drive signal corresponding to a pattern of cells to be engraved by said stylus and also for electronically adjusting said drive signal to provide an engraving signal to account for a variance between said pattern of cells and a predetermined pattern of cells; and a driver coupled to said processor and said engraving head, said driver being responsive to said engraving signal in order to engrave said pattern of cells;

wherein said processor comprises a function generator for generating an adjustment function corresponding to a shape of said stylus.

7. The engraver as recited in claim 6 wherein said adjustment function is non-linear.

8. The engraver as recited in claim 7 wherein said adjustment function comprises a plurality of adjustment lines which generally correspond to a plurality of tones of a plurality of engraved cells.

9. The engraver as recited in claim 6 wherein said adjustment function comprises a plurality of adjustment lines.

10. An engraver for engraving a cylinder comprising:

an engraving head having a stylus for engraving said cylinder;

a processor for generating a drive signal corresponding to a pattern of cells to be engraved by said stylus and also for electronically adjusting said drive signal to provide an engraving signal to account for a variance between said pattern of cells and a predetermined pattern of cells; and a driver coupled to said processor and said engraving head, said driver being responsive to said engraving signal in order to engrave said pattern of cells;

wherein said variance corresponds to a wear of said stylus.

11. An engraver for engraving a cylinder comprising:

an engraving head having a stylus for engraving said cylinder;

a processor for generating a drive signal corresponding to a pattern of cells to be engraved by said stylus and also for electronically adjusting said drive signal to provide an engraving signal to account for a variance between said pattern of cells and a predetermined pattern of cells; and a driver coupled to said processor and said engraving head, said driver being responsive to said engraving signal in order to engrave said pattern of cells;

wherein said drive signal is a voltage signal, said processor comprising a signal generator for boosting said voltage signal to account for said variance;

wherein said variance corresponds to a wear of said stylus.

* * * * *